US006781823B1

(12) United States Patent
Nyack

(10) Patent No.: US 6,781,823 B1
(45) Date of Patent: Aug. 24, 2004

(54) COMPLETE OFFICE PORTABLE COMPUTERS IMPROVEMENT

(75) Inventor: Norris Gifling Nyack, Los Angeles, CA (US)

(73) Assignee: Norris G Nyack, Jr., Los Angeles, CA (US)

( * ) Notice: Subject to any disclaimer, the term of this patent is extended or adjusted under 35 U.S.C. 154(b) by 285 days.

(21) Appl. No.: 09/711,412

(22) Filed: Nov. 13, 2000

(51) Int. Cl.[7] .................................................. G06F 1/16
(52) U.S. Cl. ....................... 361/683; 361/686; 361/687; 220/334; 220/335; 346/145; 364/704
(58) Field of Search ................................. 361/625, 683, 361/686, 687, 679–685, 724–730, 752–759, 825, 827, 829; 364/705.1, 708, 708.1, 706.1; 206/320, 305, 523, 576, 214, 223, 328, 449; 190/9, 35, 115, 900; 346/145; 400/685, 88, 691, 69, 680, 682; 312/208, 223.2; 248/183, 503, 503.1, 183.1–183.4; 297/188.01; 379/58, 447, 428, 440, 433; 224/275, 929; 455/74, 90, 85, 128, 403; 200/305, 320, 334, 523, 576

(56) References Cited

U.S. PATENT DOCUMENTS

| | | | | | |
|---|---|---|---|---|---|
| 5,242,056 A | * | 9/1993 | Zia et al. | ...................... | 206/576 |
| 5,552,957 A | * | 9/1996 | Brown et al. | ............... | 361/683 |
| 5,559,932 A | * | 9/1996 | Machida et al. | ............ | 358/1.15 |
| 5,625,534 A | * | 4/1997 | Okaya et al. | ................ | 361/686 |
| 5,816,725 A | * | 10/1998 | Sherman et al. | ............ | 400/692 |
| 6,028,764 A | * | 2/2000 | Richardson et al. | ......... | 361/681 |
| 6,115,241 A | * | 9/2000 | Hu | ............................... | 361/683 |
| 6,134,105 A | * | 10/2000 | Lueker | ........................ | 361/683 |
| 6,206,480 B1 | * | 3/2001 | Thompson | ................... | 361/625 |
| 6,219,227 B1 | * | 4/2001 | Trane | ......................... | 361/683 |
| 6,234,389 B1 | * | 5/2001 | Valliani et al. | .............. | 235/380 |
| 6,362,954 B1 | * | 3/2002 | LeVander | .................... | 361/683 |
| 6,597,568 B2 | * | 7/2003 | Ryder | ......................... | 361/683 |
| 6,654,235 B2 | * | 11/2003 | Imsand | ........................ | 361/683 |

\* cited by examiner

Primary Examiner—Michael Datskovsky

(57) ABSTRACT

The Complete Office Portable computers combine eighteen unique additional features/devices/machines into one personal computer unit in order to make access, and relocation of equipment simplified. The combination of the machines incorporated into The Complete Office Portable Computers create a new frontier in the art by providing the ability to interface with wireless technologies and perform more task/functions than other state of the art personal computer units presently on the market or that which is considered as old in the art. The Complete Office Portables open up new avenues of communications and E commerce transacting for PC users as well. The combination and additions comprise of 1 Digital Cameras, 2 Magnetic Card Slides, 3 Telephones, 4 Voice/memo Recorders, 5 Speakerphones, 6 Condenser Microphones, 7 AM/FM Radio's with 120 watt base booster speakers, 8 Paper Trays, 9 Printers, 10 Fax Machines, 11 Copy Machine, 12 Scanning Device, 13 Paper Shredding Device, 14 Hidden Featured, 15 Internal Illuminating Device's, 16 Removable Monitors, 17 Removable Keyboards, and 18 Easy portability of all the above stated in this abstract of the invention; makes The Complete Office Portable Computer units unique and a big improvement and new to the art.

1 Claim, 10 Drawing Sheets

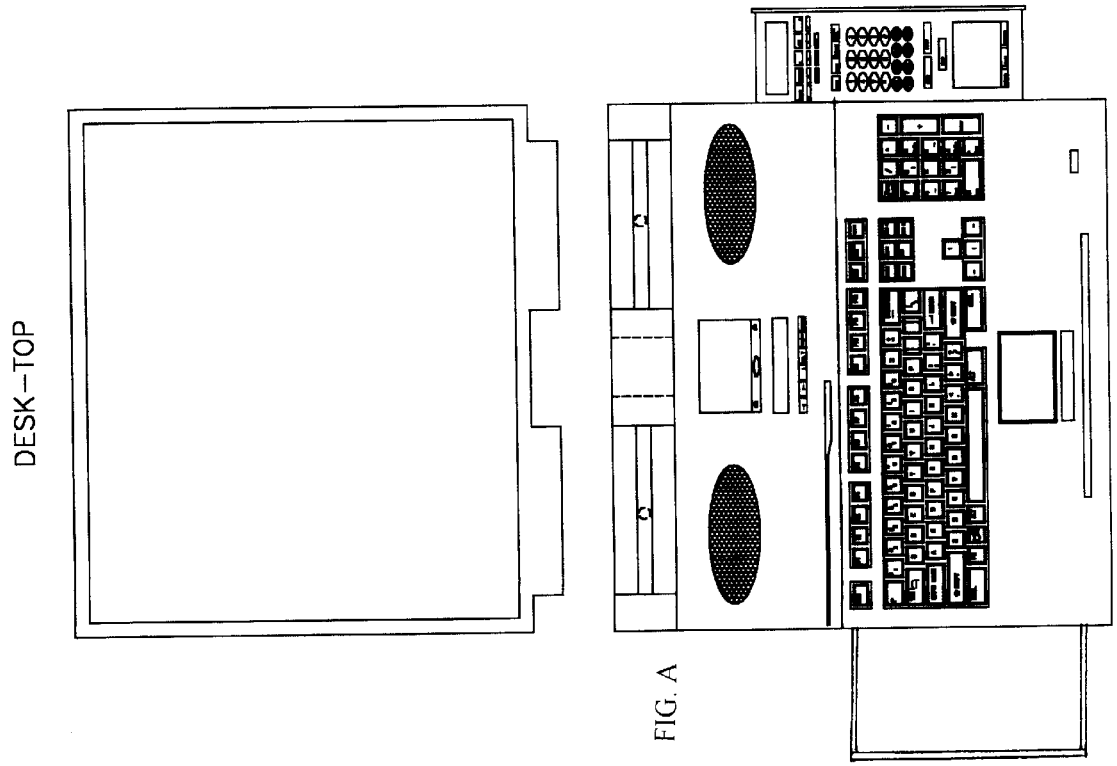
FIG. A
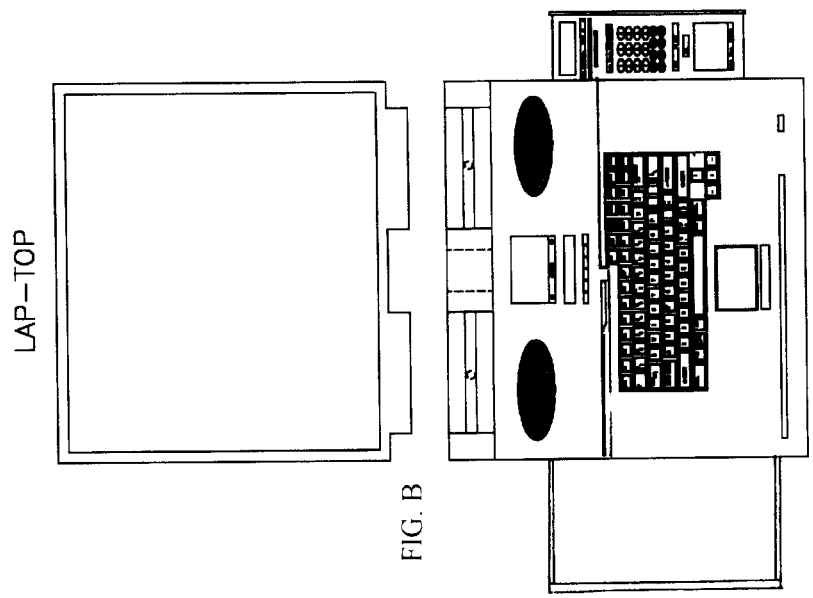
FIG. B

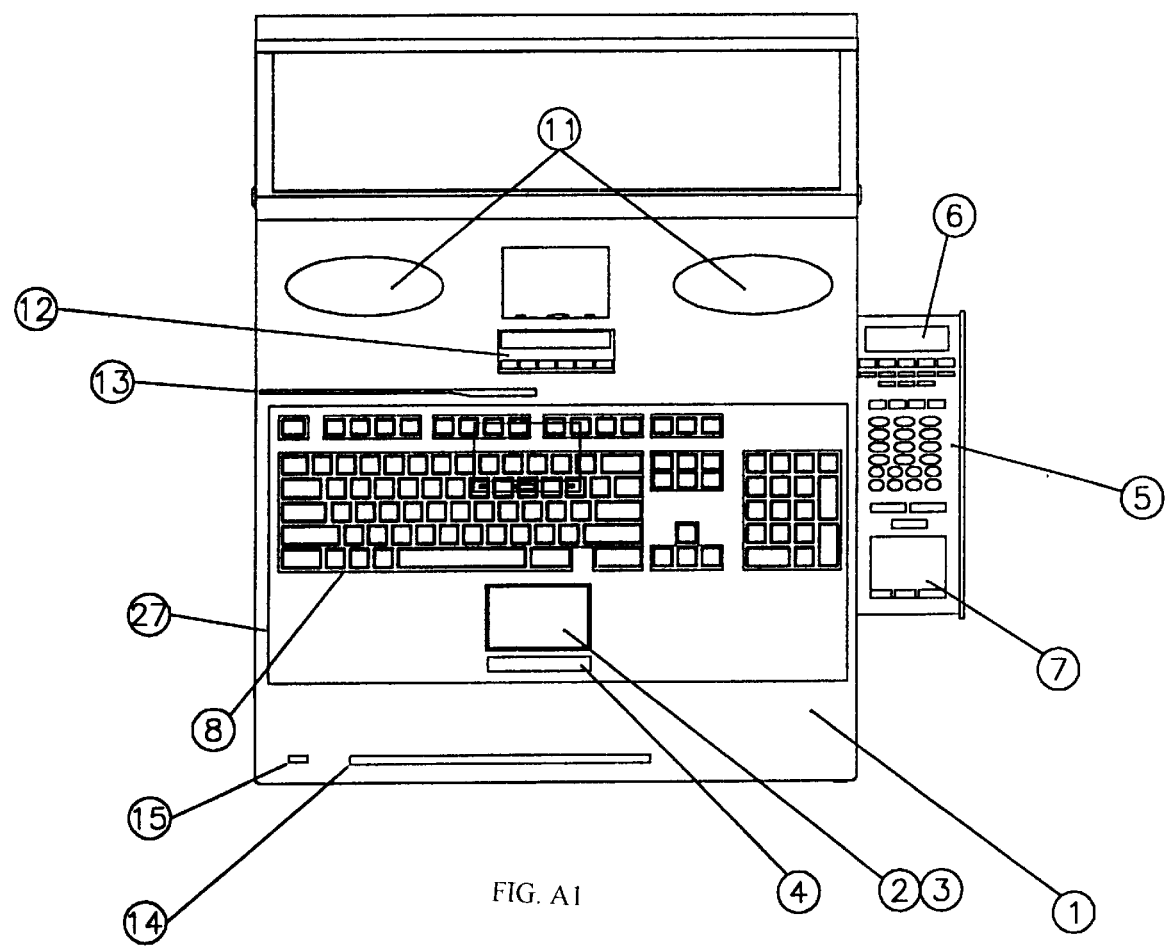
FIG. A1

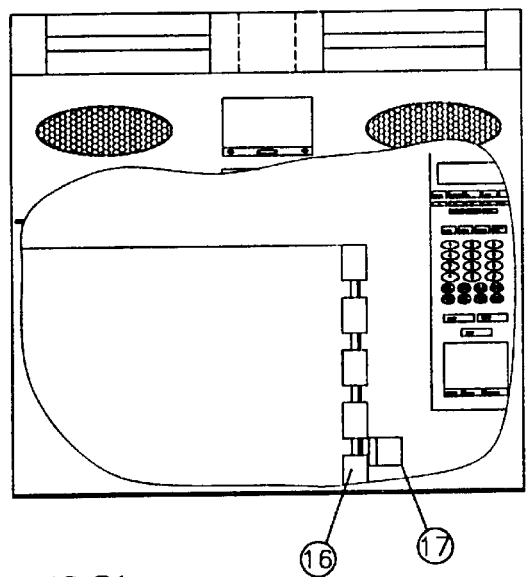
FIG. B1
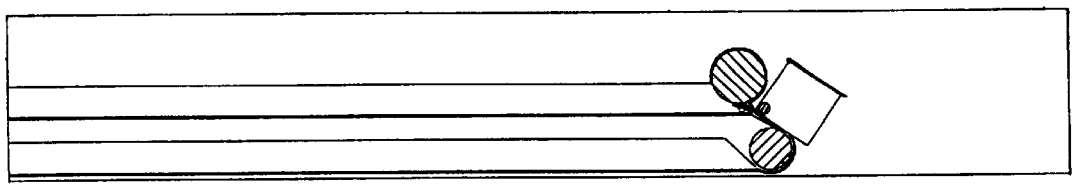
FIG. B2

LAP-TOP
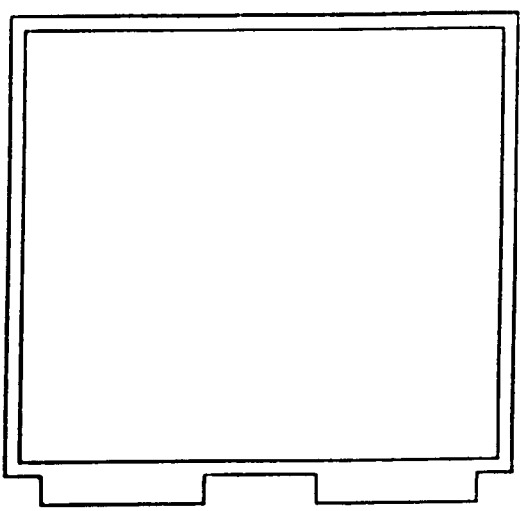
FIG. B3
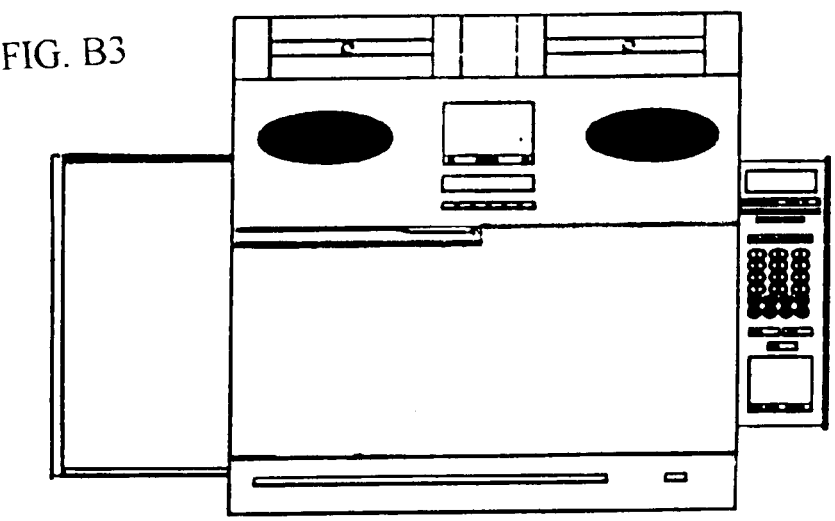
FIG. B4
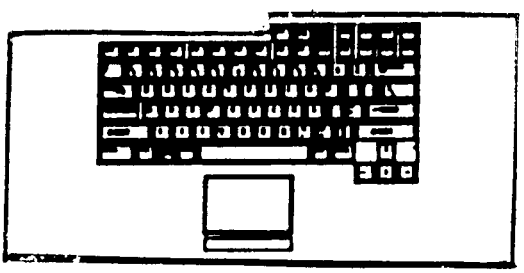

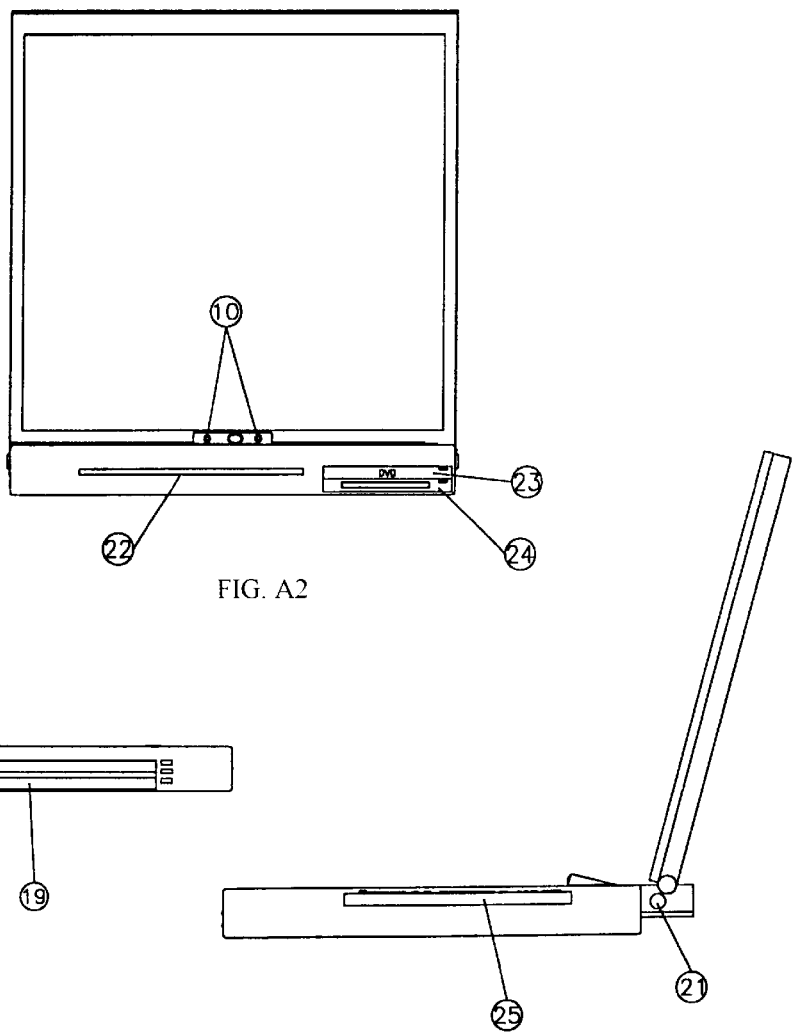

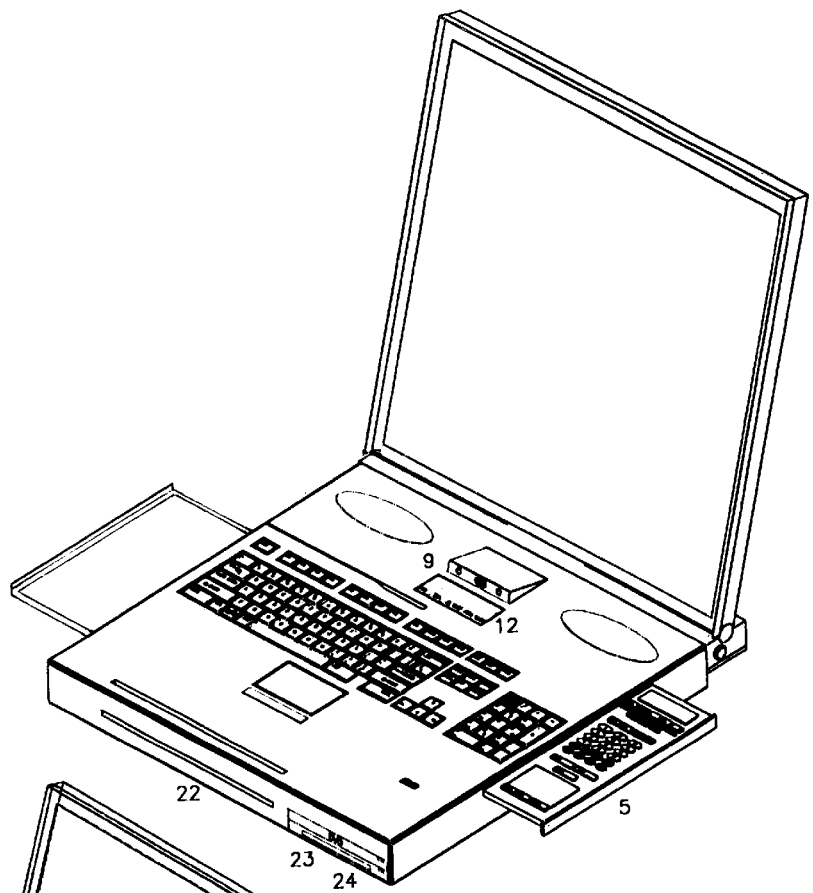
FIG. A5
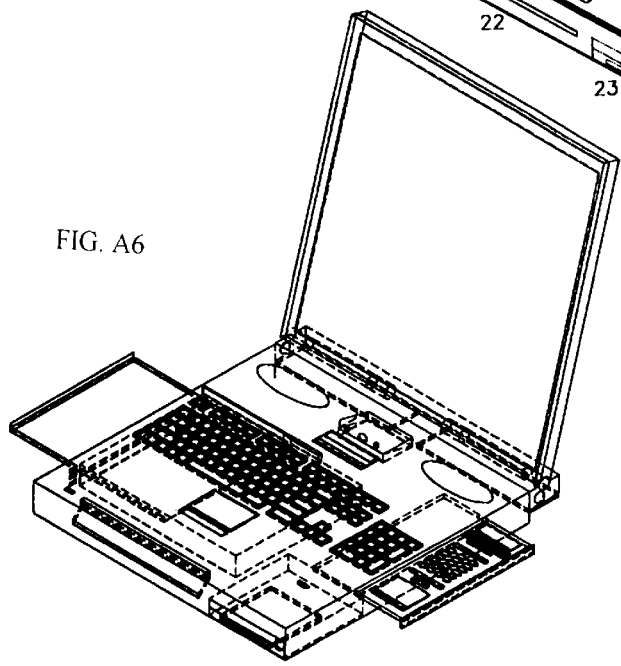
FIG. A6

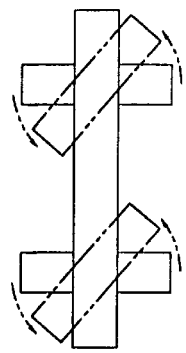
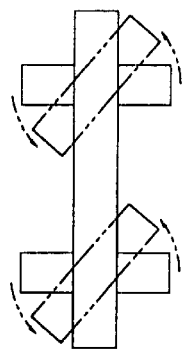
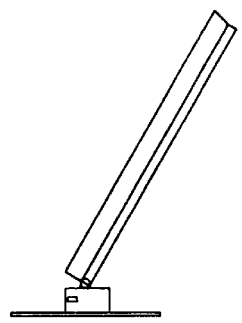
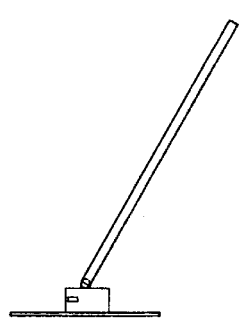
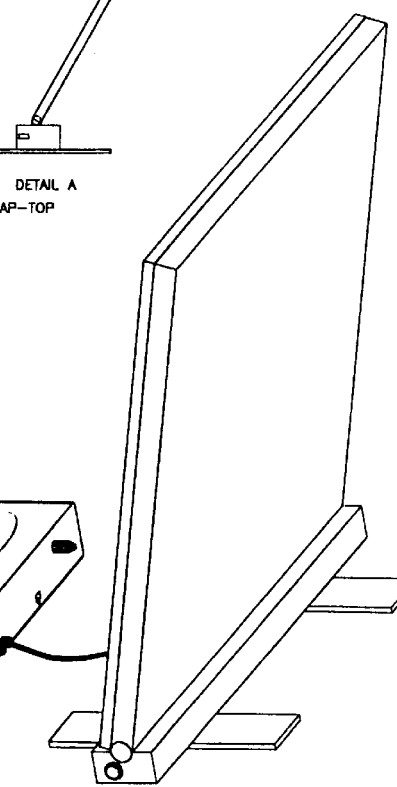
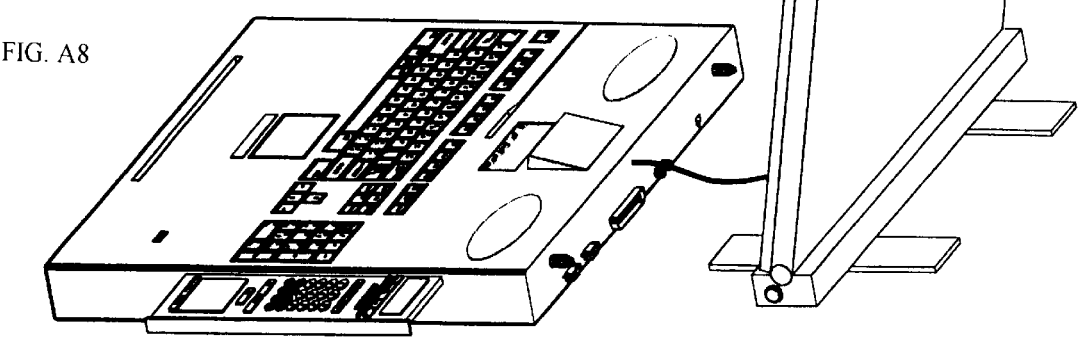
FIG. A7
FIG. B5
FIG. A8

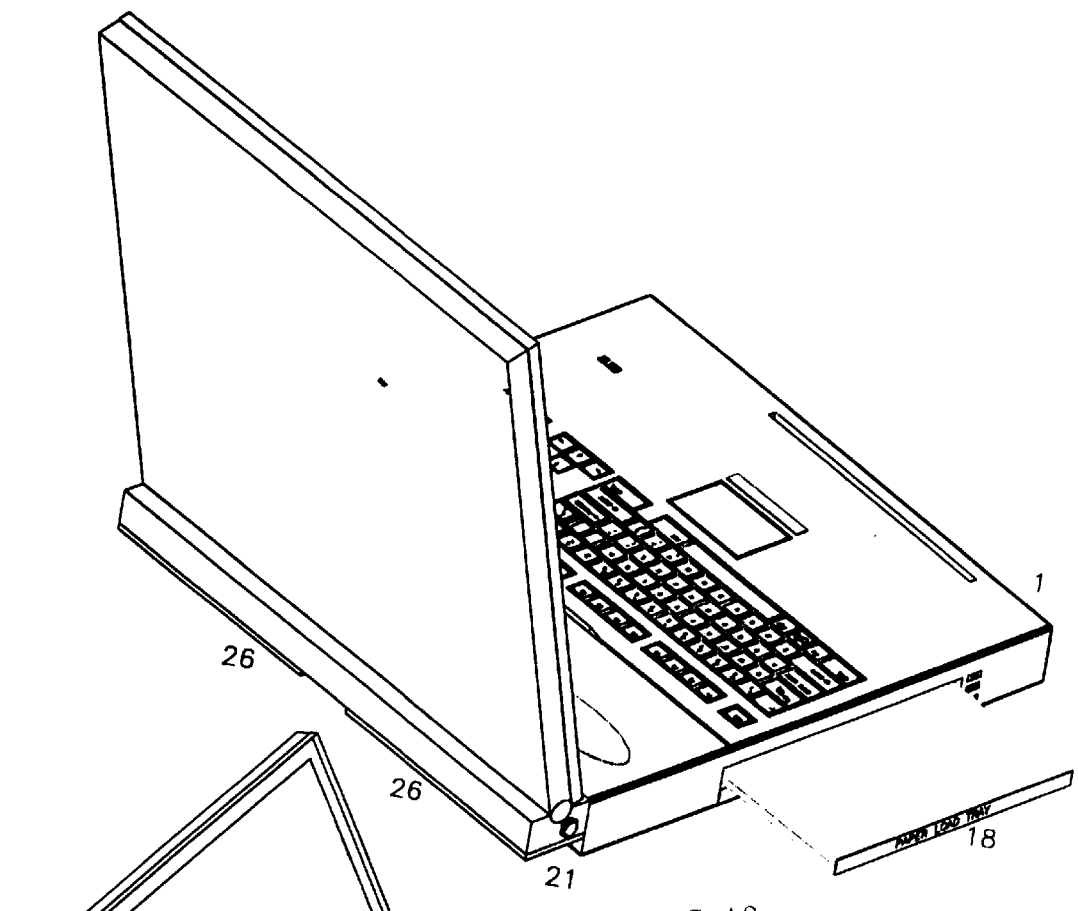
FIG. A9
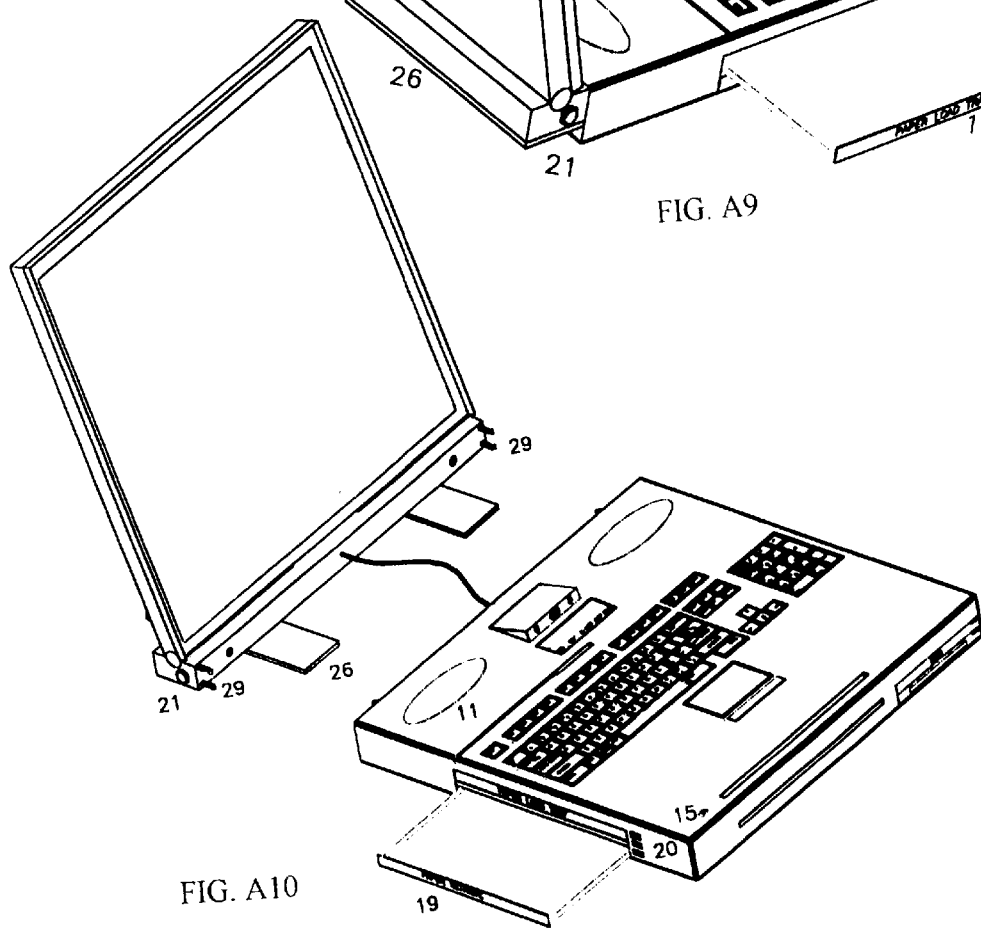
FIG. A10

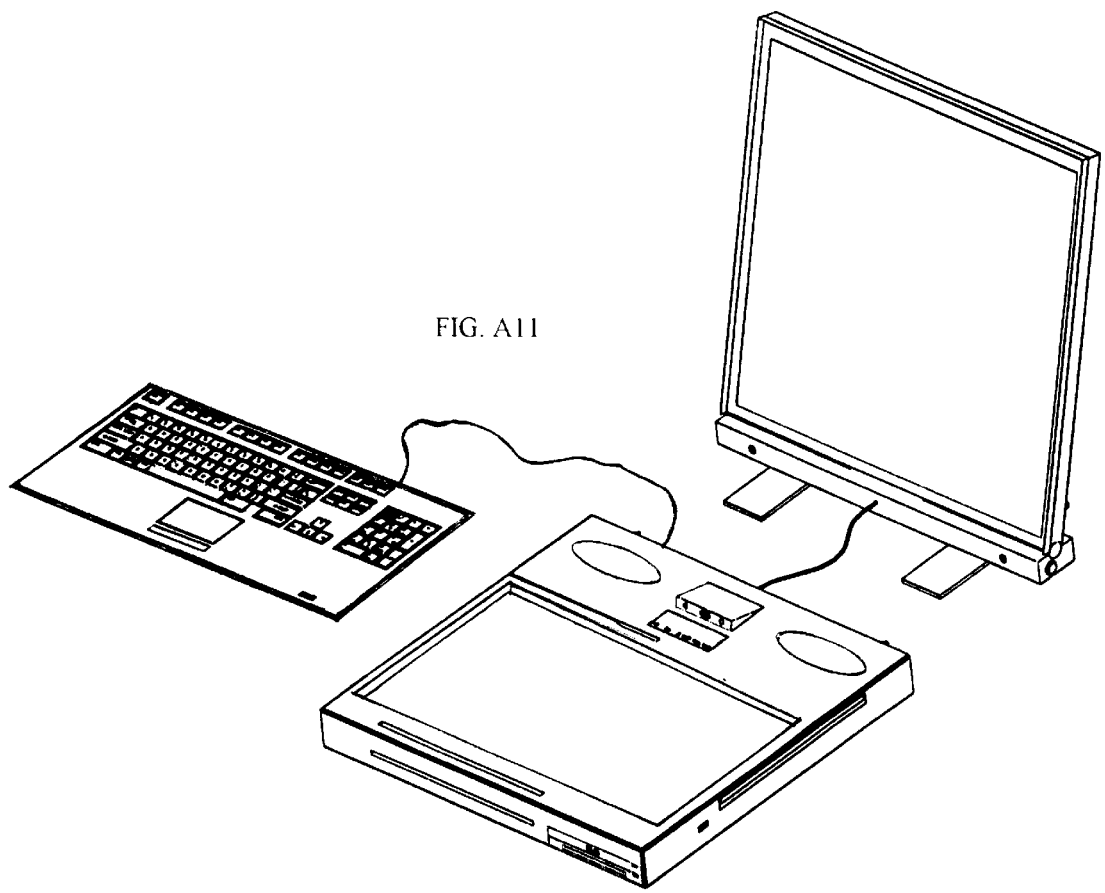
FIG. A11

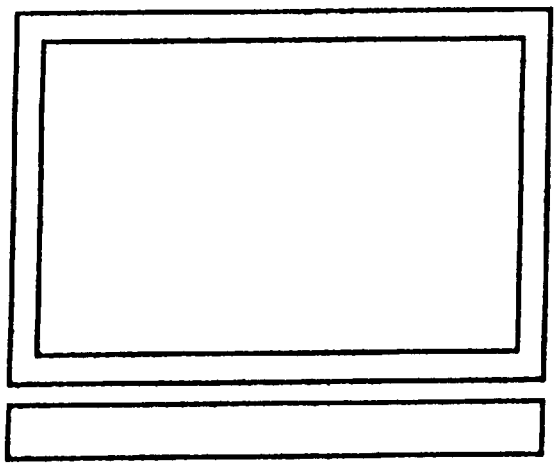
FIG. C
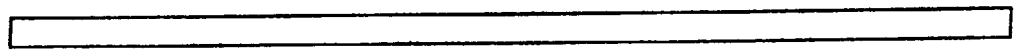
FIG. D

COMPLETE OFFICE PORTABLE COMPUTERS IMPROVEMENT

BACKGROUND OF THE INVENTION

The present invention improvement is a single computer unit, which combines several separate office components/devices necessary to perform most office requirements for convenience, and practical access to several added services. The added devices include optional paper shredder, video camera, scanner, telephone, digital recorder/player, A/M F/M radio, magnetic card slide, illuminating keyboard, quick mouse, removable monitors, removable keyboards, and a fax machine/copy machine/printer. The equipment takes up less space and is easy to move from place to place and does not involve relocating, reorganization, or reset up of several separate bulky peripheral devices. The invention consist of two versions of one sleek low profile computer unit design by which all of the fore mentioned devices are combined into the chassis of each portable computer unit. The laptop version and the desktop version feature the same layout and design, and are compatible with wireless technologies. The Complete Office Portable Computer improvement solves the #1 problem of purchasing many separate devices to connect to a computer and #2 eliminates the time consuming task of relocating hardware/devices involved when desired or necessary. With The Complete Office Portable all that is required to have access to all of the fore mentioned devices is to plug in the unit and press the on button. The fore mentioned makes The Complete Office Portables a huge improvement over other personal computers of the past years in the art.

SUMMARY OF INVENTION

The Complete Office Portable Computers are designed and constructed to make it more convenient for computer users to utilize their 18 added features making business, work, communications, and related task pertaining to their use faster and easier. The fourth mentioned is achieved by combining conventional and compatible peripherals, which are normally purchased separately, all into one unit. This added machinery combined in The Complete Office Portables; make them unique and further advanced than others in the art. The features include. 1. Live Digital Hide Away Camera for teleconferencing. 2. Magnetic Credit Card Slide for purchases and payments over the Internet. 3. Compact Hide Away Telephone for telecommunications. 4. Compact Hide Away Digital Voice Recorder for dictation assistance, etc. 5. Internal Speaker Phone. 6. Internal Microphone for teleconferencing. 7. A/M F/M radio with dual 120-watt base booster speaker system for entertainment. 8. Internal Paper trays and Printing device to produce printed matter. 9. Internal Fax Machine whereby the electronic features are combined with the printing and scanning electronic circuitry. 10. Copy Machine 11. Internal Scanning Device whereby electronic features are combined with fax machine and printing device and are hide away features. 12. Built in Quick Mouse for right and left-handed users. The Quick Mouse eliminates one click button for faster reaction time. The selection button is also the navigating pad; by depressing the navigating pad it will select. The right click button is the button below the navigating pad. 13. Internal Paper Shredding Device for disposal of unwanted documents. 14. Sleek Consolidated Low Profile Design, which conceals most of the features mentioned on the surface. 15. Internal Illuminating device lights all the keys and their features from the bottom of the keyboard so that each word and letter can be seen clearly in low light environments. 16. Easy Portability of a Desktop Computer. The Complete Office Portables are both a combination of Desktop and Laptop and their design are the same. This design creates the opportunity for desktop users to transport their computers in the exact same manner as laptop users. The desktop version is bigger in size than the laptop version. 17. Detachable/Removable Monitors. 18. Detachable/Removable keyboards. Left and Right hand reverse repositioning of the phone and print function machine for user preference. The Complete Office Portables come with removable monitors to make it convenient for computer users to distance themselves from the computer units monitor, or have the monitor placed somewhere other than the chassis of the computer unit itself. The Fore mentioned added features in this description and design do not exist in or on any other computer units. Although the Fore mentioned added features exist as separate peripherals/devices. The Complete Office Portables consolidate the fore mentioned features all into one super machine improvement, be it the desktop version or the laptop version. By combining and placement of any of the fore mentioned features into the chassis of the computer unit itself where all/most of the machinery of the computer is located. This is also our main claim for our Complete Office Portable Computers Improvement.

BRIEF DESCRIPTION OF THE DRAWINGS

FIG. A is a top view of the Desk Top model of this invention with the phone and paper tray extended and the monitor separate from its base.

FIG. B is a top view of the Lap Top model of this invention with the phone and paper tray extended and the monitor separate from its base.

FIG. A1 is a top view of the Desk Top model with reference numbers indicating the features 1, 2, 3, 4, 5, 6, 7, 8, 11, 12, 13, 14, 15, and 27 of this invention, which comprise of 1. The computer chassis, 2. The quick mouse pad. 3. left mouse button, 4. Right mouse button, 5. the phone/fax/printer/scanner pad, and 6. The phone/fax/printer/scanner pad screen, 7. Voice recorder, 8. Full keyboard, 11. Built in base speakers 12. AM/FM radio, 13. Credit card slide, 14. Paper shredder, 15. ON/OFF switch for paper shredder, and 27. Removable keyboard.

FIG. B1 is a cut out top view of the Lap Top model showing reference numbers 16 and 17 the rotating pinch wheels and ink cartridge housing of the printing devise, and the phone recessed into the computer chassis of this invention.

FIG. B2 is an inside front view of 16 and 17 plus a side view of the paper trays of this invention.

FIG. B3 is a top view of the Lap Top model with the keyboard removed from the chassis of the computer of this invention.

FIG. B4 is a top view of the Lap Top keyboard removed from the chassis of the computer of this invention.

FIG. A2 is a front view of the Desk Top model with reference # indicating features 10, 22, 23, and 24 10. The condenser microphones located on each side of the video camera lens, 22. Paper shredder output exit, 23. DVD Drive, and 24. 3.50 Floppy disk drive of this invention.

FIG. A3 is a side view of the Desk Top model reference # indicating 9, 18, 19, and 21. 9. The videoconference camera. 18. Paper load access door, 19. Paper retrieve access door and 21. Monitor detaching mechanism.

FIG. A4 is a side view showing reference #25 and 21. 25. Phone/Fax/Printer/Copy/Scanner/Voice-Recorder access, and 21. Monitor Detaching Mechanism.

Description of Drawing (Continued)

FIG. A5 is a top view of the Desk Top Model with reference #5, 9, 12, 22, 23, and 24. 5. Phone/Fax/Printer/Scanner pad, 9. Video Conference Camera, 12. AM/FM Radio controls and LCD screen, 22 Paper Shredder exit, 23. DVD Drive, and 24 3.50 Floppy disk drive of this invention.

FIG. A6 is a transparent view of FIG. A5.

FIG. A7 shows a side and bottom view of the detachable monitor of the Desk Top model of this invention.

FIG. B5 shows a side and bottom view of the detachable monitor of the Lap Top model of this invention.

FIG. A8 shows reference to the application of FIG. A7 and FIG. B5.

FIG. A9 is a combination rear side view with reference numbers 1, 18, 21, and 26 of this invention. 1. The computer chassis, 18. Paper load access door extended, 21. Monitor detaching mechanism, and 26. Rotating balancing pads.

FIG. A10 shows 11, 15, 19, 20, 21, 26, and 29. 11. Built in speakers, 15 On/Off switch for paper shedder, 19 Paper retrieve access door, 20 Ink cartridge load access to Fax/Copier/scanner/Printer, 21. Monitor detaching mechanism, 26 Rotating balancing pad and 29. Connecting fasteners of this invention.

FIG. A11 shows a detached keyboard and monitor of the Desk Top model of this invention.

FIG. C is close up view of the Quick Mouse and second selection button of this invention.

FIG. D is a top view of the paper shredder intake door of this invention, which opens for document intake and closes for dust protection.

DETAILED DESCRIPTION OF THE INVENTION

The Complete Office Portable Computers resemble laptop computers in their appearance when the monitor and keyboard are attached to the computers chassis, and resemble desktop computers when the monitor and keyboard are disconnected from the chassis of the computer and are larger in size than prior laptops used in the art. On the surface of the chassis which is the top view. The Monitor, Base Speakers, Video Camera Housing Compartment, Magnetic Card Slide, Radio Dial, Keyboard, Hidden Quick Mouse, and Paper Shredder intake door are visible.

The Complete Office Portable Computers are made of the same materials that are presently being used to make computers: Titanium, ABS Plastics, other thin light weight metals, and plastics etc, and are constructed and manufactured in the same manner as other personal computers in the art.

1. On the computers side view one rectangle is visible which represents an Extendable Telephone/Fax/Copy/Scanner/and Digital Voice Dictation Device Pad, which extends out of the computer chassis for access.

2. On the computers opposite side view two rectangles are visible and represent the two extendable 8.5–11 inch paper tray ports, which extend outward. One to load paper the other to receive printed material.

The for mentioned descriptions 1. And 2. are sometimes placed in reverse/opposite order to accommodate users of the invention for their preference of location of the added devices.

On the front view of the computer an elongated rectangle is visible. That is the opening for shredded paper output, adjacent to said device on the same surface is the CD Rom/DVD Drive and the 3.5 Floppy/Zip Drive.

Ports for connecting to current, external devices such as LPT1, comports 1 and 2, SCSI, fax-modem, etc are located on the rear of the computer chassis.

The bottom view is a flat solid surface.

The chassis of The Complete Office Portable Computers are designed and constructed to accommodate the additions of the added features/devices/machinery; which makes the improvements simple to incorporate into each computer unit.

Detailed Description (continued)

The specific improvement is that The Complete Office Portable Computers incorporate into the chassis of the computer several added features, devises, and machinery that are not incorporated in any other personal computers. The features, devices, machinery include a Digital Camera, Magnetic Card Slide, Telephone, Voice/Memo Recorder, Speakerphone, Condenser Microphone, AM/FM Radio, Fax Machine/Printer/Copier/Micro Scanner, Quick Click Mouse, Paper Shredder, Illuminated typing keys, Removable Monitor, and a Removable Keyboard optional or all combined per computer unit.

The fore mentioned additions distinguish the invention from all other personal computers in the art.

The added machinery incorporated in The Complete Office Portable Computers Improvement enhances the ability for personal computers to be more useful in many areas of the art and heighten the ability for personal computers to perform more tasks making them more valuable and convenient.

Numbering Identification List

1. COMPUTER
2. MOUSE PAD
3. LEFT MOUSE BUTTON
4. RIGHT MOUSE BUTTON
5. PHONE/FAX/PRINTER/SCANNER PAD
6. PHONE/FAX/PRINTER/SCANNER PAD SCREEN
7. VOICE RECORDER
8. FULL KEYBOARD WITH OPTION TO ILLUMINATE
9. VIDEO CONFERENCE CAMERA
10. CONDENCER MICROPHONES
11. BUILT IN BASE BOOST SPEAKERS
12. AM/FM RADIO CONTROLS AND LCD SCREEN
13. MAGNETIC STRIP SLIDE (FOR CREDIT CARDS, ECT.)
14. ELECTRONIC PAPER SHREDDER
15. ON/OFF SWITCH FOR PAPER SHREDDER
16. ROTATING PINCH WHEELS
17. INK CARTRIDGE HOUSING
18. PAPER LOAD ACCESS DOOR
19. PAPER RETRIEVE ACCESS DOOR
20. INK CARTRIDGE LOAD. ACCESS TO FAX/COPIER/SCANNER/PRINTER
21. MONITOR DETACHING MECHANISM
22. PAPER SHREDDER EXIT
23. DVD-DRIVE
24. 3.50 FLOPPY DISK DRIVE
25. PHONE/FAX/PRINTER/COPY/SCANNER/VOICE-RECORDER ACCESS
26. ROTATING BALANCING PAD
27. REMOVEABLE KEYBOARD
28. ALIGNMENT STABILIZERS
29. CONNECTING FASTENERS

What is claimed is:

1. A multi functional portable computer workstation comprising of a internal paper shredding device to shred documents and envelopes, hidden web camera and condenser microphone for teleconferencing, magnetic card slide which reads credit card information, speaker phone, digital voice recorder, AM/FM radio, printing unit which performs the operations of printing faxes received, scanning, and copying, camouflaged mouse, which blends in with the console, which gives the impression that, it is not present, removable monitor which can stand on it's rotating balancing pads, as well as existing I/O, comports, SCSI adapters, pc slot, zip drive, floppy drive, and USB ports currently on the market place all said integrated into one portable computer chassis/unit.

* * * * *

UNITED STATES PATENT AND TRADEMARK OFFICE
CERTIFICATE OF CORRECTION

PATENT NO. : 6,781,823 B1 Page 1 of 1
DATED : August 24, 2004
INVENTOR(S) : Norris G. Nyack, Jr.

It is certified that error appears in the above-identified patent and that said Letters Patent is hereby corrected as shown below:

<u>Title page,</u>
Item [75], Inventors, should read -- Norris G. Nyack, Jr. --

Signed and Sealed this

Second Day of November, 2004

JON W. DUDAS
*Director of the United States Patent and Trademark Office*